Patented July 25, 1939

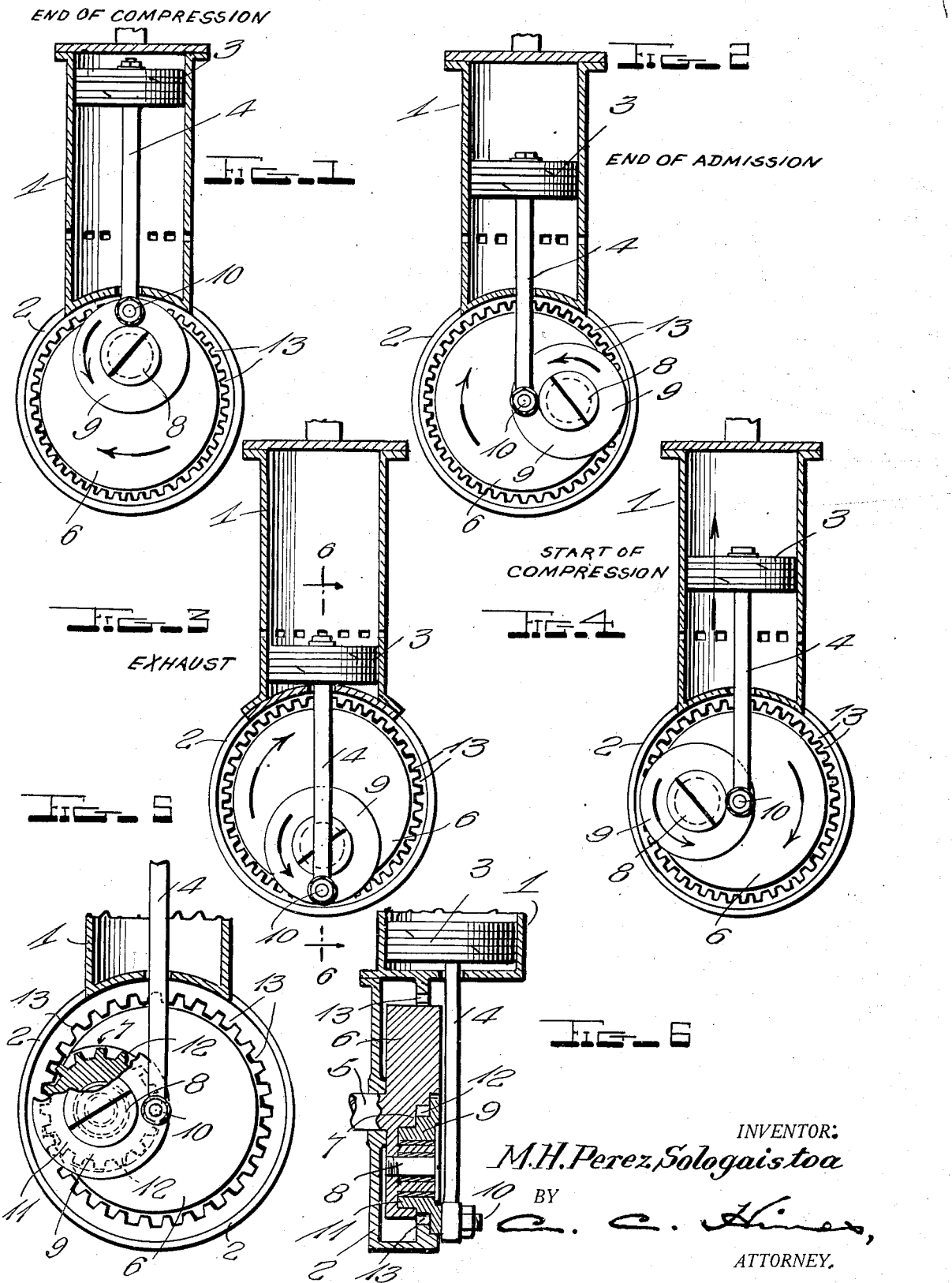

2,166,975

UNITED STATES PATENT OFFICE 2,166,975

MECHANICAL MOVEMENT

Manuel Humberto Perez Sologaistoa, San Pedro Sula, Honduras

Application October 10, 1936, Serial No. 105,096

3 Claims. (Cl. 74—52)

This invention relates to mechanical movements, and has special reference to means adapted for use in the transmission and conversion of rectilinear motion into curvilinear motion, or vice versa. More especially the invention relates to a mechanical movement for use in connection with a crank coupled between a rotary element, such as a shaft, and a reciprocatory element, such as a rod, for the transmission of motion from one to the other, as, for example, the transmission of power from a piston impelled rod to a crank shaft from which power is taken. The present invention is particularly valuable for use in air, steam, internal combustion and other engines and other apparatus wherein a rotary shaft is driven through a rotary crank from an impulse piston, or, conversely, the piston or its equivalent is driven through a connecting crank from an impulse shaft.

In the present disclosure I have, for purposes of exemplification, shown the application of my invention to the crank connection between an engine piston rod and a crank shaft driven thereby from a working piston, although it is to be understood that it is not limited thereto as the principle of the invention may be employed in various types of apparatus. As is well known, in an engine construction using a crank-driven connecting rod of ordinary type the angularity of motion of the connecting rod requires the employment of a compensating pivotal connection between the rod and piston in order that the latter may be permitted to move in as nearly a rectilinear path as possible. Through the angularity of motion of the rod, however, the pivot is subjected to more or less wear and tear, requiring replacement of its bearing surfaces at more or less frequent intervals, and any looseness of the pivotal connections causes jerky motions and injurious strains on the engine mechanisms. In addition, the angularity of motion of the rod causes more or less side motion of the piston, resulting in excessive friction and power losses and so-called "piston slap" producing uneven wear and tear on the surfaces of the cylinder and piston, so that leakage of motive fluid and lubricant and further power losses occur. Such engine constructions also, in the case of internal combustion motors, causes the production of excessive high temperatures, much above those produced by fuel combustion alone, so that the use of cooling means of complex type for temperature control purposes is necessary.

One object of my invention is to provide a novel, simple, reliable and effective construction of mechanical movement for controlling a crank action between a rotary element and a reciprocatory element, whereby the latter is permitted and caused at all times to move in a straight rectilinear path.

Another object of my invention is to provide a novel construction of means of the character described whereby a piston and its rod coupled by a crank to a rotary shaft may be permitted and caused to move in a straight rectilinear path, and whereby, if desired, the use of a pivotal connection between the rod and piston may be dispensed with.

Still another object of the invention is to provide a novel construction of mechanical movement or compensating and controlling means between a crank shaft and piston rod, such as of an engine, whereby the stated objections to prior engine structures are obviated in a simple and effective manner.

Still another object of the invention is to provide novel motion transmitting and controlling means between a crank and rod connection whereby motors of less than four cylinders and in fact having but a single working cylinder and piston may be equilibrated.

Still another object of the invention is to provide means whereby the rotary motion of the rotary element, such as a shaft, may be transmitted into reciprocatory motion of a straight line character, whereby a simple and easy working type of mechanism of this character may be produced.

Still another object of the invention is to provide a construction and arrangement of the parts of the motion transmitting means whereby such parts are disposed to lie within a common plane, or substantially so, thus allowing a very compact organization to be obtained.

With these and other objects in view, the invention consists of the features of construction, combination and relationship of parts, hereinafter fully described and claimed, reference being had to the accompanying drawing, in which:—

Fig. 1 is a view partly in front elevation and partly in vertical section of an engine embodying my invention, for example, an internal combustion engine, showing the piston at the limit of its up stroke.

Figs. 2, 3 and 4 are similar views showing the piston and parts of the motion transmitting means at other points in the travel of the piston.

Fig. 5 is a vertical transverse section through the gear casing showing the controlling gears.

Fig. 6 is a section on line 6—6 of Fig. 3.

Referring now more particularly to the drawing, 1 designates an engine cylinder, connected at its base with a crank case or gear case 2, said cylinder having working therein a piston 3 coupled to a connecting rod 4. The rod 4 may be either fixedly or pivotally connected with the piston, as desired. Since, however, the rod 4 moves in a substantially straight line, a pivotal connection is not necessary and the rod and piston may be rigidly connected together.

Journaled in the crank case 2 is a shaft 5, which may be either a driving shaft or a driven shaft. To this shaft is suitably fixed a rotating crank disk or eccentric 6, adapted to serve the function of a fly wheel as well as a motion transmitting and controlling element. At one side of the axial center of this disk 6 is formed a recess 7, opening through the front face of the disk. Fixed to the disk and arranged within this recess so as to be peripherally spaced from the walls thereof is a bearing member 8, on which is revolubly mounted a crank disk or eccentric 9 of relatively smaller diameter than the crank disk or eccentric 6. This smaller crank disk or eccentric 9 carries a crank pin 10 to which the lower end of the connecting rod 4 is connected and by which it is pivotally coupled to the disk 9, whereby in the reciprocations of the rod 4 rotary motion will be transmitted to the disk 9 and through the same to the disk 6.

Formed on the crank disk or eccentric 9 is a gear comprising a rim 11 having spur gear teeth 12 which mesh with the teeth of an internal gear 13 formed or provided as an internal gear rim upon the casing 2, which gears operate to control the rotation of the disk 6 to govern its speed or rotation with respect to the speed of motion of the piston 3 so that a synchronizing action will be obtained in the operation of the parts to control the action of the disk 9 and therethrough the position of the crank pin 10 to adapt the piston 4 to always work in a straight line. The weight of the disk 6 may be such as to counterbalance the weight of the crank connection and its resistance and to act in effect like a fly wheel to prevent any tendency of the parts to bind or hang on dead centers and to maintain a smooth and easy continuity of motion of the parts.

The cylinder 1 and piston 3 may constitute such parts of an air engine, an internal combustion engine or a steam engine, or any motor or mechanism in which a crank shaft and connecting rod or its equivalent are coupled for the transmission of motion from one to the other. Accordingly as it is desired to translate rectilinear into curvilinear motion or curvilinear motion into rectilinear motion, the power to be transmitted may be applied either to the rod 4 or to the shaft. The rod in practice may be extended and connected with the piston of a second cylinder arranged in alinement with the cylinder 1 and on the opposite side of the crank case 2, in the application of the invention, for example, to an engine having opposed cylinders, so that pistons in both cylinders may be coupled to one and the same crank mechanism for an obvious working action, and the number of cylinders and pistons and crank devices employed may be increased or multiplied to any degree desired.

The operation is as follows:

When the piston 3 is at the limit of its upstroke and about to begin its down stroke, as shown in Fig. 1, it will be seen that the crank disk 9 and crank pin 10 are at their highest point in their orbit of travel, with the pin 10 lying between and in vertical alinement with the rod 4 and axis of the disk 9. Assuming that the disk 6 travels in a clockwise direction in its orbit of travel, it will be understood by reference to Figs. 2 and 3 that on the down stroke of the piston the movement of the disk 6 in such direction, in which it carries the disk to the right of the center line of the cylinder will cause, through the action of gears 11 and 13, a rotation of the disk 9 in a counter-clockwise direction, thereby maintaining the center line position of the crank pin through the controlling and compensating motion thus set up. This position of the disks and crank pin is maintained until the piston reaches the limit of its down stroke, at which time the disk 9 and pin 10 reach the lowest position in their orbit of travel and the pin again assumes a position coincident with the center axis of the disk 9, as shown in Fig. 3. As the piston then begins its up stroke the disk 9 is carried around for up travel to the left of the center line of the cylinder, while through its rotation the pin 10 maintains its center line position, and this position is maintained through the rotation of the disks 6 and 9 on the up travel of the piston until the up stroke of the piston is completed and the parts again reach the position shown in Fig. 1. The cycle of operation thus described is then repeated as the reciprocation of the piston is continued, so that the pin 10 is always maintained in a centered position and the piston permitted and caused to reciprocate in a true rectilinear path while rotary motion is at the same time transmitted to the shaft 5. The ratio of the gears 11, 13 is such as to accurately time the movements of the disks relative to each other and to the piston 4.

By this means, in the use of the invention in an internal combustion, steam or other motor, the objections incident to the use of ordinary crank and piston couplings are avoided and the disadvantages thereof overcome, preventing undue friction, piston slap and other undue wear and tear and power and other losses due both to friction and leakages. My invention accordingly reduces the amount of friction and wear and tear on the motor to the minimum, enables greater power to be obtained with less fuel, and increases the efficiency and prolongs the life of the motor. This novel and improved crank and rod connection also gives a highly efficient balancing or equilibrating action, so that motors of less than four cylinders and down to single-cylindered motors will be equilibrated and caused to act with great ease and smoothness. Furthermore, this invention lends itself perfectly to a motor using a long-stroke piston, allowing a greater proportion of the working pressure of the charge to be used and reducing loss of power caused by discharge of unused portions of the fuel through the exhaust.

It will, of course, be understood that the mechanical movement may be employed in a mechanism in which driving motion is imparted to the shaft 5 for reciprocating the rod 4 for operating a piston or other working element, in which the advantage is obtained of having the rod and piston or other working part reciprocate in a straight line.

Some of the advantages of my invention when employed in connection with a four-cycle internal combustion motor will be understood by reference to the drawing. Fig. 1 shows the piston at the end of its compression stroke and at the time ignition takes place. Fig. 2 shows the piston at a point midway of its power stroke, and Fig. 3 the piston at the end of its exhaust stroke.

It will be evident therefore that the piston will be impelled by the explosive force and the expansion of the gases the full length of the cylinder during one half of the orbit of travel of the crank, exhaust of gases then taking place through ports in the cylinder wall and the exhaust valve in the cylinder head. Figs. 2 and 4 show the end of the admission stroke and starting point of the compression stroke of the piston, from which it will be seen that each is approximately equal to 45% of the full working stroke. A longer range stroke is thus obtained to utilize the full forces of the gases, thus obtaining greater power and preventing the exhaust of and waste of unconsumed fuel. Scavenging is completed by lengthening the stroke through exhaust ports in the cylinder wall at the end of the working stroke and by the exhaust valve throughout the exhaust stroke, so that clean fresh air for the power stroke is thus obtained, unmixed with products of previous combustion. The power thus is direct, the crank traveling along the projected axis of the cylinder, thus avoiding side thrust, and owing to the described action there is no dead center in any position of the mechanism. Great economy of fuel is accordingly secured by the working action produced with low heating of the cylinder walls, whereby cooling is rendered easier.

From the foregoing description, taken in connection with the drawing, the construction, mode of operation and advantages of my novel and improved mechanical movement will be understood and appreciated by those versed in the art without a further and extended description. While I have shown certain means for carrying my invention into practical effect, it is to be understood that the invention is not limited thereto, as any equivalent means, falling within the scope of the appended claims, may be employed without departing from the spirit or sacrificing any of the advantages of the invention.

What I claim is:

1. In a mechanical movement of the character described, the combination with a cylinder, a piston operating therein, and a rod connected to the piston, of a motion transmitting means comprising a casing arranged axially at right angles to the cylinder and having an annular body wall and a side wall, said body wall being provided with a guide opening through which the rod extends, a stationary gear ring in said casing and carried by the body wall thereof, a shaft extending into the casing through and journalled in the side wall thereof, a fly wheel disk disposed in the casing and within the space bounded by the gear ring, the said fly wheel disk being connected with the shaft at its side facing the side wall of the casing and the opposite side of said fly wheel disk having a recess opening through said side of the disk and through a portion of its periphery, a crank disk rotatably mounted in said recess, and provided with peripheral gear teeth projecting through the peripheral portion of the recess in the fly wheel disk and engaging the teeth of the gear ring, the outer side of said crank disk being provided with an outwardly extending crank pin coupled to the connecting rod, and a fastening member for the crank disk extending through the crank disk and detachably engaging the fly wheel disk and forming a bearing on which said crank disk rotates.

2. In a mechanical movement of the character described, the combination with a cylinder, a piston operating therein, and a rod connected to the piston, of a motion transmitting means comprising a casing arranged axially at right angles to the cylinder and having an annular body wall and a side wall, said body wall being provided with a guide opening through which the rod extends; a stationary gear ring in said casing and carried by said body wall thereof, a shaft extending into the casing through and journalled in the side wall thereof, a fly wheel disk disposed in the casing coaxially therewith and within the space bounded by the gear ring and connected at its side facing the side wall of the casing with said shaft, the opposite side of said disk having a recess opening through said side of the disk and through a portion of its periphery, a crank disk rotatably mounted in said recess and provided with peripheral gear teeth projecting through the peripheral portion of the recess in the fly wheel disk and engaging the teeth of the gear ring, the outer side of said crank disk being arranged substantially in the plane of the recessed side of the fly wheel disk and provided with an outwardly extending crank pin coupled to the connecting rod, and a pin disposed in the recess in the fly wheel disk and projecting through the crank disk axially thereof to form a bearing on which the crank disk rotates, said pin being engaged at its inner end with the fly wheel disk and having an enlarged portion or head at its outer end countersunk in and bearing on the crank disk to hold the same from outward displacement.

3. In a mechanical movement of the character described, a cylinder, a piston operating therein, a gear casing arranged axially at right angles to the axis of the cylinder, a rod connected to the piston and extending outwardly from the cylinder, a gear ring disposed in the casing and supported thereby in spaced relation to the side wall, a rotary shaft extending into the casing at one side thereof, a fly wheel disk disposed in the casing within the space enclosed by the gear ring and fixed at one side to the rotary shaft, said disk being provided in its opposite side with a recess arranged eccentric to its axis and opening through said face and through a portion of its periphery, and a crank disk journaled in said recess, said disk carrying a crank pin coupled to the rod and being provided with peripheral gear teeth arranged to successively project in the rotation of the disk outwardly through the peripheral portion of the recess in the fly wheel disk for engagement with the teeth of the gear ring.

MANUEL HUMBERTO PEREZ
SOLOGAISTOA.